United States Patent
Katano

(10) Patent No.: US 8,576,248 B2
(45) Date of Patent: Nov. 5, 2013

(54) IMAGE PROCESSING METHOD AND IMAGE PROCESSING APPARATUS

(75) Inventor: Yasuo Katano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1180 days.

(21) Appl. No.: 11/852,718

(22) Filed: Sep. 10, 2007

(65) Prior Publication Data

US 2008/0278480 A1  Nov. 13, 2008

(30) Foreign Application Priority Data

Sep. 29, 2006 (JP) .................................. 2006-269017

(51) Int. Cl.
G09G 5/00 (2006.01)

(52) U.S. Cl.
USPC ............................ 345/619; 345/419; 345/643

(58) Field of Classification Search
USPC .............................. 463/30; 345/419; 701/301
See application file for complete search history.

(56) References Cited

U.S. PATENT DOCUMENTS

| | | | |
|---|---|---|---|
| 5,675,720 A | 10/1997 | Sato et al. | |
| 6,141,015 A * | 10/2000 | Tanaka | 345/427 |
| 6,191,796 B1 * | 2/2001 | Tarr | 345/581 |
| 6,336,864 B1 | 1/2002 | Nakanishi | |
| 6,809,743 B2 * | 10/2004 | Ebersole et al. | 345/633 |
| 2003/0043147 A1 | 3/2003 | Heim et al. | 345/421 |
| 2004/0166934 A1 * | 8/2004 | Nakata et al. | 463/30 |
| 2005/0190179 A1 * | 9/2005 | Hong et al. | 345/419 |
| 2006/0022974 A1 * | 2/2006 | Yamamoto et al. | 345/419 |
| 2006/0200314 A1 * | 9/2006 | Ajioka et al. | 701/301 |
| 2006/0256110 A1 * | 11/2006 | Okuno et al. | 345/419 |
| 2007/0173968 A1 * | 7/2007 | Koichi | 700/141 |

FOREIGN PATENT DOCUMENTS

| | | |
|---|---|---|
| JP | 08-077210 A | 3/1996 |
| JP | 09-237285 A | 9/1997 |
| JP | 2000-167248 A | 6/2000 |
| JP | 2005-071285 A | 3/2005 |
| JP | 2005-246071 A | 9/2005 |
| JP | 2006-178662 A | 7/2006 |

OTHER PUBLICATIONS

Wade, Bretton. "BSP Tree FAQ." gamedev.net. Aug. 22, 1999. http://www.gamedev.net/page/resources/_/technical/graphics-programming-and-theory/bsp-tree-faq-r657.*

Ranta-Eskola, Samuel. "Binary space partioning trees and polygon removal in real time 3d rendering." Uppsala master's theses in computing science (2001).*

K. Ward, et al., "Modeling Hair Using Level-of-Detail Representation", Proceedings of the 16th International Conference on Computer Animation and Social Agents (CASA '03), XP010639659, pp. 41-47 May 8, 2003).

S. Sinjur, et al., "Collision Detection Between Moving Objects Using Uniform Space Subdivision", XP-002463571 http://www.cescg.org/CESCG-2001/SSiniur/Index.html), pp. 1-10.

Japanese Office Action, issued on Aug. 26, 2011 in corresponding Japanese Application No. 2006-269017.

C. Ericson, Chapter 4 "Bounding Volumes", Real-Time Collision Detection, Morgan Kaufmann Publishing, pp. 75-123 (Dec. 2004).

* cited by examiner

*Primary Examiner* — Phi Hoang
(74) *Attorney, Agent, or Firm* — Fitzpatrick, Cella, Harper & Scinto

(57) ABSTRACT

A polygon selection unit selects, on the basis of a given condition, a base unit to be used in a collision determination process from base units included in a three-dimensional virtual object. A collision determination unit executes the collision determination process between three-dimensional virtual objects by using the base unit selected by the polygon selection unit for each virtual object.

6 Claims, 13 Drawing Sheets

FIG. 3

```
Shape {
    geometry IndexedFaceSet {
    ccw FALSE
    coord DEF Points Coordinate {
        point [
            8.005249  −6.990356  −17.622370,
            8.157200  −7.294493  −17.282743,
            8.184751  −6.831179  −17.255793,
            8.056519  −6.615624  −17.620712,
            6.822301  −7.701208  −16.293016,
            5.569949  −8.194297  −16.291119,
            6.363140  −9.099982  −15.699952,
            7.631446  −8.615777  −15.713489,
            6.750839  −7.809068  −18.175129,
            6.568625  −7.890739  −18.119741,
            .....
        ]]
        coordinatex [
            2003. 2007. 2008. −1,
            2003. 2008. 2004. −1,
            2004. 2008. 2009. −1,
            2004. 2009. 2005. −1,
            2005. 2009. 2010. −1,
            2005. 2010. 2006. −1,
            2007. 2011. 2012. −1,
            2007. 2012. 2008. −1,
            2008. 2012. 2013. −1,
            2008. 2013. 2009. −1,
            .....
        ]
        convex TRUE
        creaseAngle 1.562070
    }
    .....
    }
}
```

301, 302, 303

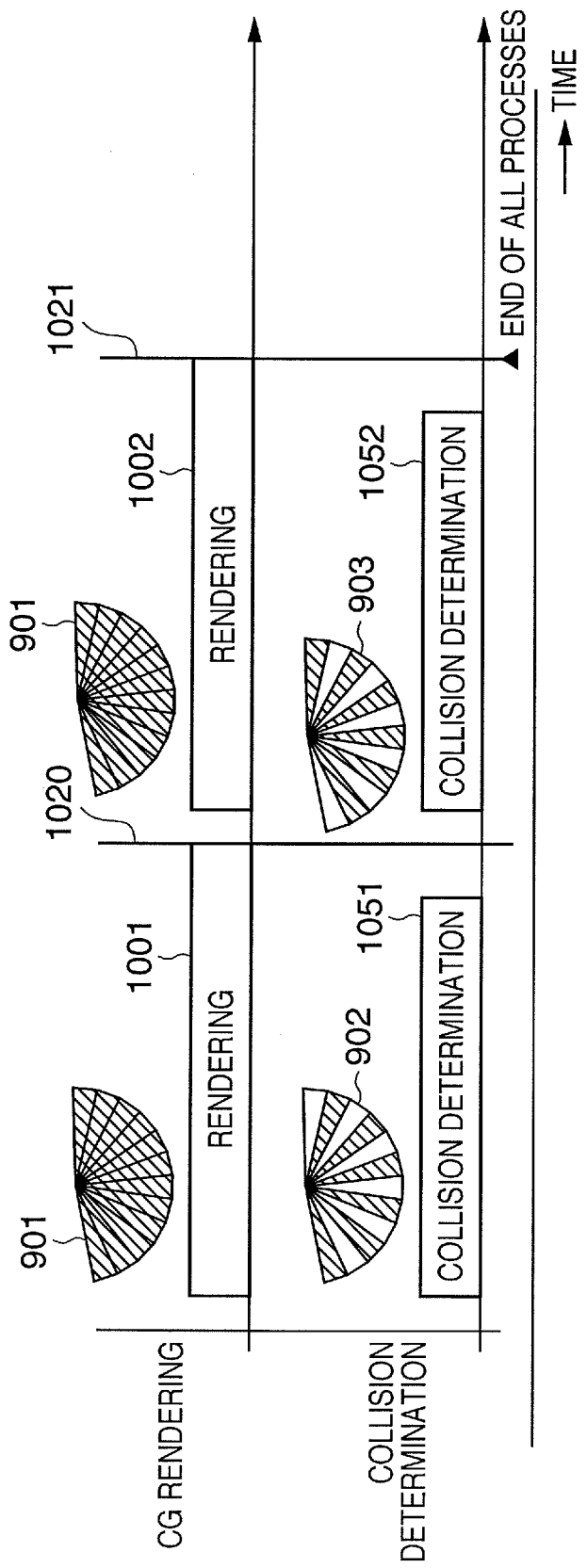

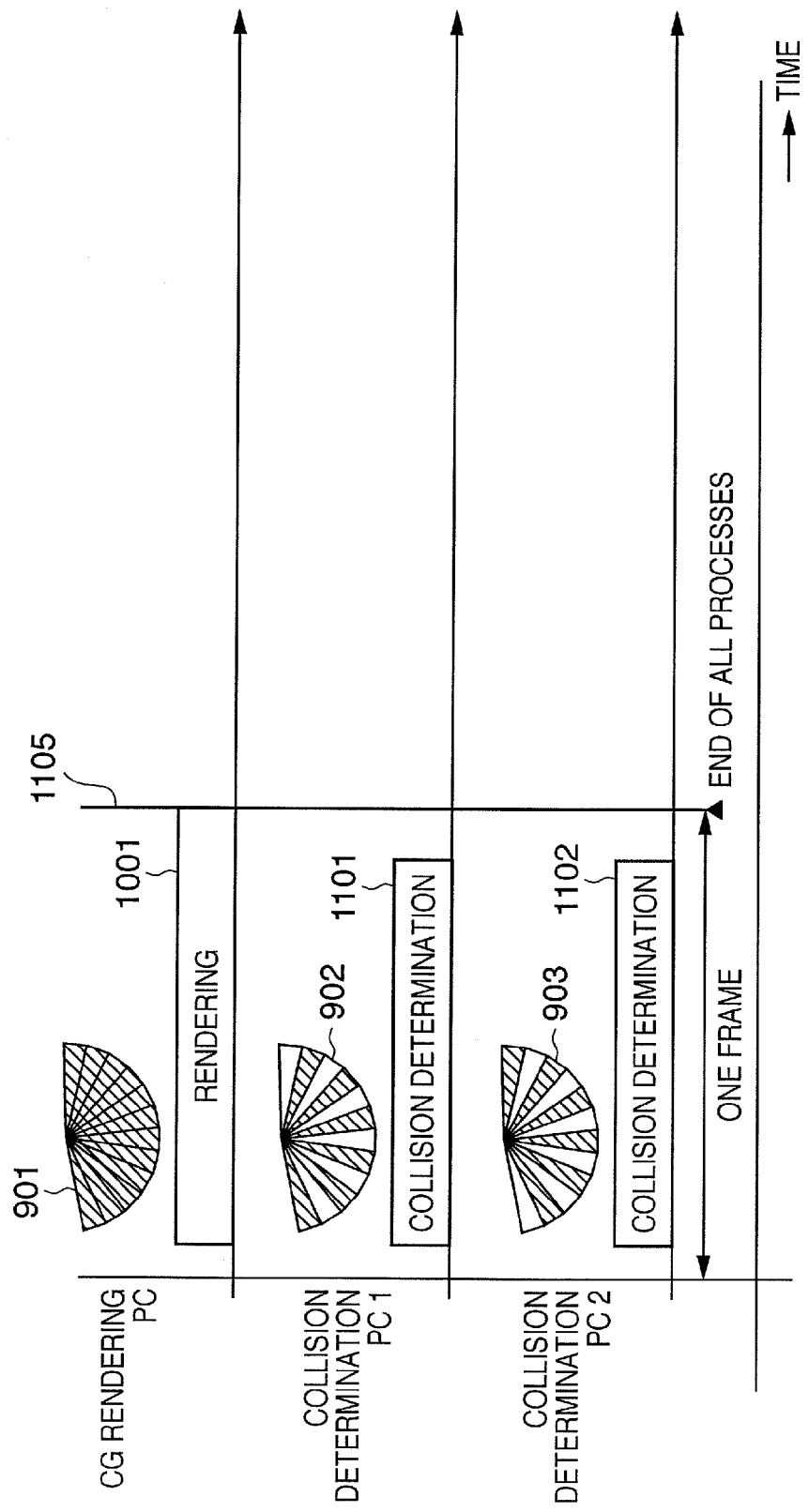

IMAGE PROCESSING METHOD AND IMAGE PROCESSING APPARATUS

BACKGROUND OF THE INVENTION

1. Field of the Invention

The present invention relates to a technique of determining collision between three-dimensional virtual objects.

2. Description of the Related Art

The progress of computer hardware, display technologies, and graphic processors is enabling advanced CG (Computer Graphics) expressions. Along with this, CG is also used in industrial applications such as CAD (Computer Aided Design), and CG images are becoming more complex. In the CG technologies, a collision determination function which calculates the physical behaviors and collision state between three-dimensional objects to not only ensure the reality of images but also express more real behaviors is regarded to be very important as the CG rendering performance improves.

The collision determination function calculates whether three-dimensional polygons which approximate three-dimensional objects collide against each other so that impossible behavior can be avoided to prevent the polygons from, e.g., getting into each other.

The collision determination function is used for, in the design field, e.g., making of a product prototype using CAD data, virtual trainings before existence of an actual machine, and virtual operation verification tests to check whether components collide against each other in operating design data. In the entertainment field, the collision determination function is used to provide real behaviors of CG objects in movies and games. In the robot field, the collision determination function is used for simulations for obstruction avoidance or a process of kinetic trajectory generation. That is, applications in many fields are expected.

Particularly in a system for presenting real-time experience, interactively reacting to a user's motion in synchronism with CG rendering and reflecting operations conforming the physical world on CG rendering in real time plays an important role for improving the user's feeling of participation. Hence, the collision determination function is very important. Such systems especially include VR (Virtual Reality) and MR (Mixed Reality).

The conventional collision determination technology fundamentally approximates a three-dimensional object to a three-dimensional polyhedron and divides the surface into a plurality of three-dimensional polygons included in the polyhedron. For all combinations of the divided polygons, the collision between the polygons is determined. In this method, When the number of polygons included in a three-dimensional polyhedron is n, the calculation cost of collision determination increases by $n^2$. For this reason, in an interactive system such as MR or VR, it is very difficult to CG-render a detailed three-dimensional object created by CAD in real time while executing collision determination.

To cope with this problem, a method preprocesses three-dimensional polygons to, e.g., remove elements having no influence on collision determination, thereby speeding up the process (Christer Ericson, "Real-Time Collision Detection", Morgan Kaufmann Publishing). This method obviates the necessity of collision determination operations for all polygons. The collision determination operation is executed by using minimum and necessary polygons, thereby speeding up the process. However, in determining collision of, e.g., long objects or an object passing through a hole, many faces may simultaneously contact each other, and it is therefore impossible to remove many polygons by the preprocess, resulting in a decrease in speed.

To prevent a decrease in calculation speed, a technique of creating three-dimensional polyhedron data with a small number of polygons in advance is often employed. Examples of this method are as follows.

Polygon reduction: After the vertex information of a three-dimensional polyhedron is optimized, the three-dimensional polyhedron is reconstructed, thereby reducing the number of polygons.

Detail level change: A condition is given to, e.g., remove a three-dimensional polyhedron of a screw or the like whose size is equal to or smaller than a threshold value or remove a hole with a diameter equal to or smaller than a threshold value, thereby reducing the detail level of each three-dimensional object. A three-dimensional polyhedron with a low detail level is separately created to decrease the number of polygons.

The conventional collision determination cannot be executed in real time for a three-dimensional object having a high detail level and a lot of polygons. For a real-time operation, currently, the number of polygons is decreased by reducing the detail level.

In such a collision determination function, CG rendering preferably operates at 30 to 60 Hz especially in a highly interactive field such as VR or MR. There are also required an operation without delay of CG rendering caused by collision determination, and simultaneously, real-time collision determination corresponding to a user's interactive operation. The important challenge for this purpose is especially to increase the speed of collision determination operation.

The collision determination operation using the prior art has two problems.

The shape changes upon polygon reduction or detail level change. More specifically, if the shape changes, an error occurs in the collision determination result of a CG-rendered three-dimensional polyhedron so no accurate collision determination can be done.

It is necessary to create data for collision determination independently of data for CG rendering. More specifically, polygon reduction or detail level change requires to separately create data different from that for CG rendering. The data needs to be separately loaded to the memory.

SUMMARY OF THE INVENTION

The present invention has been made in consideration of the above-described problems, and has as its object to provide a technique of determining collision between virtual objects at a higher speed without decreasing the memory efficiency.

To achieve the above objects, according to an aspect of the present invention, there is provided an image processing method of executing a collision determination process between three-dimensional virtual objects, comprising:

a selection step of selecting, on the basis of a given condition, a base unit to be used in the collision determination process from base units included in a three-dimensional virtual object; and a collision determination step of executing the collision determination process between three-dimensional virtual objects by using the base unit selected in the selection step for each virtual object.

According to another aspect of the present invention, there is provided an image processing apparatus for executing a collision determination process between three-dimensional virtual objects, comprising:

a selection unit adapted to select, on the basis of a given condition, a base unit to be used in the collision determination process from base units included in a three-dimensional virtual object; and a collision determination unit adapted to execute the collision determination process between three-dimensional virtual objects by using the base unit selected by the selection unit for each virtual object.

Further features of the present invention will become apparent from the following description of exemplary embodiments with reference to the attached drawings.

BRIEF DESCRIPTION OF THE DRAWINGS

FIG. 3 is a view showing a structural example of polygon sequence data generated for one virtual object by a polygon sequence generation unit 112;

FIG. 10B is a timing chart of virtual space image rendering and a collision determination process executed in parallel;

FIG. 11 is a timing chart of a process in each apparatus when m=2; and

DESCRIPTION OF THE EMBODIMENTS

Preferred embodiments of the present invention will be described below in detail with reference to the accompanying drawings.

First Embodiment

In this embodiment, at least one virtual object (designed object virtual object) simulating a designed object is placed in virtual space, and a virtual object (hand virtual object) simulating a human hand is moved in the virtual space. A collision determination process between the hand virtual object and the designed object virtual object, upon moving the hand virtual object, will be described. The collision determination process to be described below is also applicable to collision determination between arbitrary virtual objects except the hand virtual object and designed object virtual object.

Figure 1:
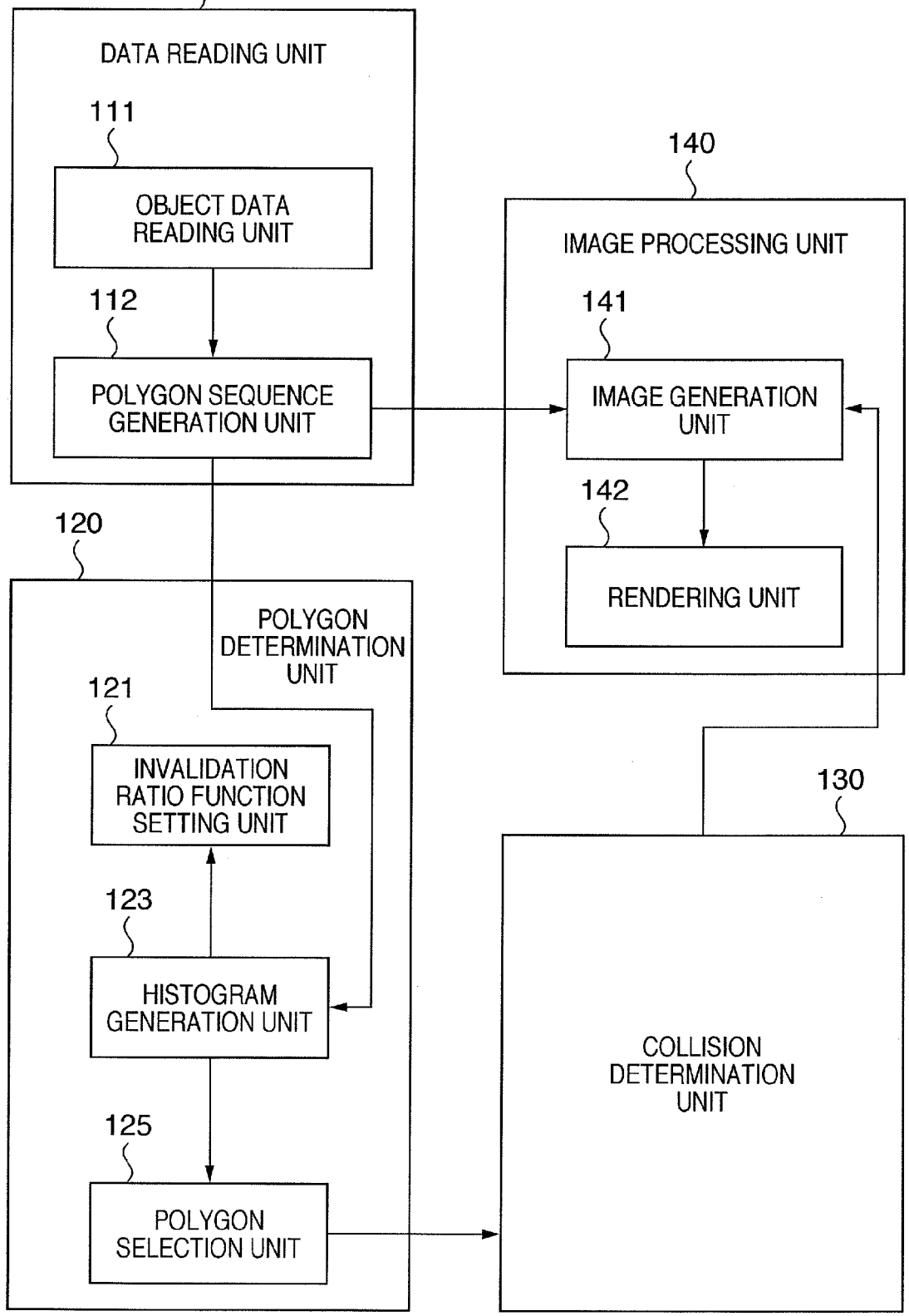
FIG. 1 is a block diagram showing the functional arrangement of an image processing apparatus according to the first embodiment of the present invention.

FIG. 1 is a block diagram showing the functional arrangement of an image processing apparatus according to the first embodiment of the present invention. As shown in FIG. 1, the image processing apparatus according to this embodiment includes a data reading unit 110, polygon determination unit 120, collision determination unit 130, and image processing unit 140.

The data reading unit 110 will be described.

The data reading unit 110 includes an object data reading unit 111 and a polygon sequence generation unit 112, as shown in FIG. 1.

The object data reading unit 111 reads out rendering data of each virtual object (object) from a memory (not shown). An example of rendering data is CAD data generated by creating a virtual object by CAD. The object data reading unit 111 sequentially outputs the rendering data of each virtual object to the polygon sequence generation unit 112.

The polygon sequence generation unit 112 sequentially converts the rendering data received from the object data reading unit 111 into polygon sequence data. That is, the polygon sequence generation unit 112 reconstructs a virtual object created by CAD into a virtual object formed from polygons. The polygon sequence generation unit 112 outputs the polygon sequence data (data of a polygon sequence forming a virtual object) of each virtual object to the polygon determination unit 120 and image processing unit 140 of the succeeding stages.

FIG. 3 is a view showing a structural example of polygon sequence data generated for one virtual object by the polygon sequence generation unit 112. Referring to FIG. 3, reference numeral 301 indicates whole polygon sequence data.

The coordinate values of vertices of each polygon are registered in the lines in an area 302. Each line (each vertex) is assigned a unique number (vertex index). For example, vertex indices 1, 2, 3, . . . are assigned sequentially downward from the uppermost line.

The vertex indices of vertices of each polygon are registered in the lines in an area 303. For example, "2003, 2007, 2008, −1" defines a polygon including three vertices: a vertex with a vertex index 2003, a vertex with a vertex index 2007, and a vertex with a vertex index 2008. Each line (each polygon) is assigned a unique number (polygon index). For example, polygon indices 1, 2, 3, . . . are assigned sequentially downward from the uppermost line.

When a virtual object is formed from polygons in advance, the object data reading unit 111 reads out polygon sequence data shown in FIG. 3 for each virtual object. In this case, the polygon sequence generation unit 112 is unnecessary.

The polygon determination unit 120 will be described next. The polygon determination unit 120 includes an invalidation ratio function setting unit 121, histogram generation unit 123, and polygon selection unit 125.

The operation of the polygon determination unit 120 upon receiving the polygon sequence data of one virtual object will be described below. Actually, the polygon determination unit 120 receives the polygon sequence data of each of a plurality of virtual objects. In this case, the polygon determination unit 120 executes the process to be explained below for the polygon sequence data of each virtual object.

Upon receiving polygon sequence data, the histogram generation unit 123 calculates the area of each polygon registered in the polygon sequence data. This process will be described in more detail.

As described above, the vertex index of each vertex included in a polygon is described in the area 303. The coordinate values of a vertex corresponding to each vertex index are described in the area 302. The histogram generation unit 123 sequentially refers to the lines in the area 303 and acquires, from the area 302, the coordinate values of vertices corresponding to the vertex indices registered in each referred line. For example, if the vertex indices registered in a line referred to in the area 303 are "1, 2, 3, −1", the histogram generation unit 123 acquires, from the area 302, the vertex coordinate values corresponding to vertex index 1, the vertex coordinate values corresponding to vertex index 2, and the vertex coordinate values corresponding to vertex index 3.

When the vertex coordinate values of the three vertices are obtained, the histogram generation unit 123 calculates the area of the polygon (triangle) formed by the three vertices. The method of calculating the area of a triangle whose three vertices have known coordinate values is known, and a description of this process will be omitted. The histogram generation unit 123 registers, in an area table, the area and the polygon index of the polygon whose area has been calculated in association with each other. The area table will be described later.

In this way, in every reference to a line in the area 303, the histogram generation unit 123 obtains, from the area 302, the coordinate value of three vertices corresponding to the three indices registered in the referred line and obtains the area of a corresponding polygon by using the three obtained vertex coordinate values. With this process, the histogram generation unit 123 can obtain the areas of all polygons registered in the polygon sequence data. The structure of polygon sequence data and the process executed by the histogram generation unit 123 are not limited to those described above as long as the object is achieved. For example, the area of each polygon may be registered in the polygon sequence data in advance. In this case, the polygon area calculation process by the histogram generation unit 123 can be omitted.

Figure 4:
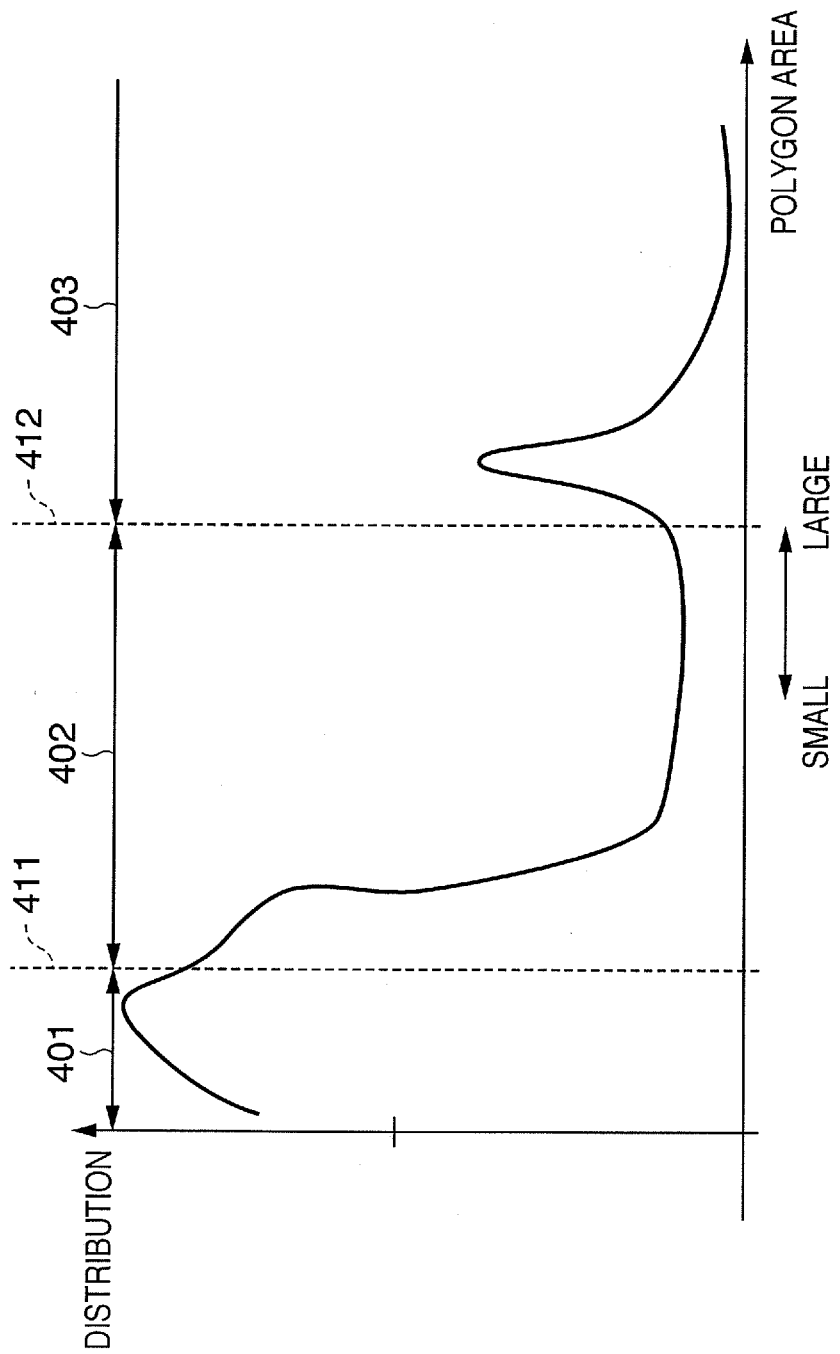
FIG. 4 is a graph showing an example of a created histogram.

The histogram generation unit 123 generates the histogram of the calculated polygon areas. FIG. 4 is a graph showing an example of a created histogram. Referring to FIG. 4, the abscissa represents the polygon area, and the ordinate represents the frequency (distribution).

Referring to FIG. 4, a number of small polygons which form very small components such as screws are distributed in a section 401. Polygons which form relatively small components such as sensor components are distributed in a section 402. Polygons of, e.g., a top panel and a panel, which are larger than the hand virtual object, are distributed in a section 403.

The histogram generation unit 123 outputs a thus generated histogram to the screen of, e.g., a display device. This allows the user of the apparatus to grasp in advance which section includes what kind of polygons in the histogram. The user checks the breaks between the sections in advance by observing the histogram and presets the breaks as threshold values. The invalidation ratio function setting unit 121 receives the setting input. For example, in FIG. 4, a polygon area at a break 411 is set as threshold value 1, and a polygon area at a break 412 is set as threshold value 2.

This setting may be done not by user input but by the invalidation ratio function setting unit 121. For example, the invalidation ratio function setting unit 121 may set two threshold values to simply divide the section between the maximum area and the minimum area in the histogram into three equal parts or set the area of the hand virtual object as only one threshold value. In this embodiment, the user sets threshold values 1 and 2. However, the following description also applies to any case using threshold values set by the invalidation ratio function setting unit 121.

The invalidation ratio function setting unit 121 sets an invalidation ratio for each of a group (group 1) including polygons each having an area smaller than threshold value 1, a group (group 2) including polygons each having an area from threshold value 1 (inclusive) to threshold value 2 (exclusive), and a group (group 3) including polygons each having an area equal to or larger than threshold value 2. The invalidation ratio indicates the ratio of polygons in a group, which are not used for collision determination. The invalidation ratio is set for each group.

Figure 5:
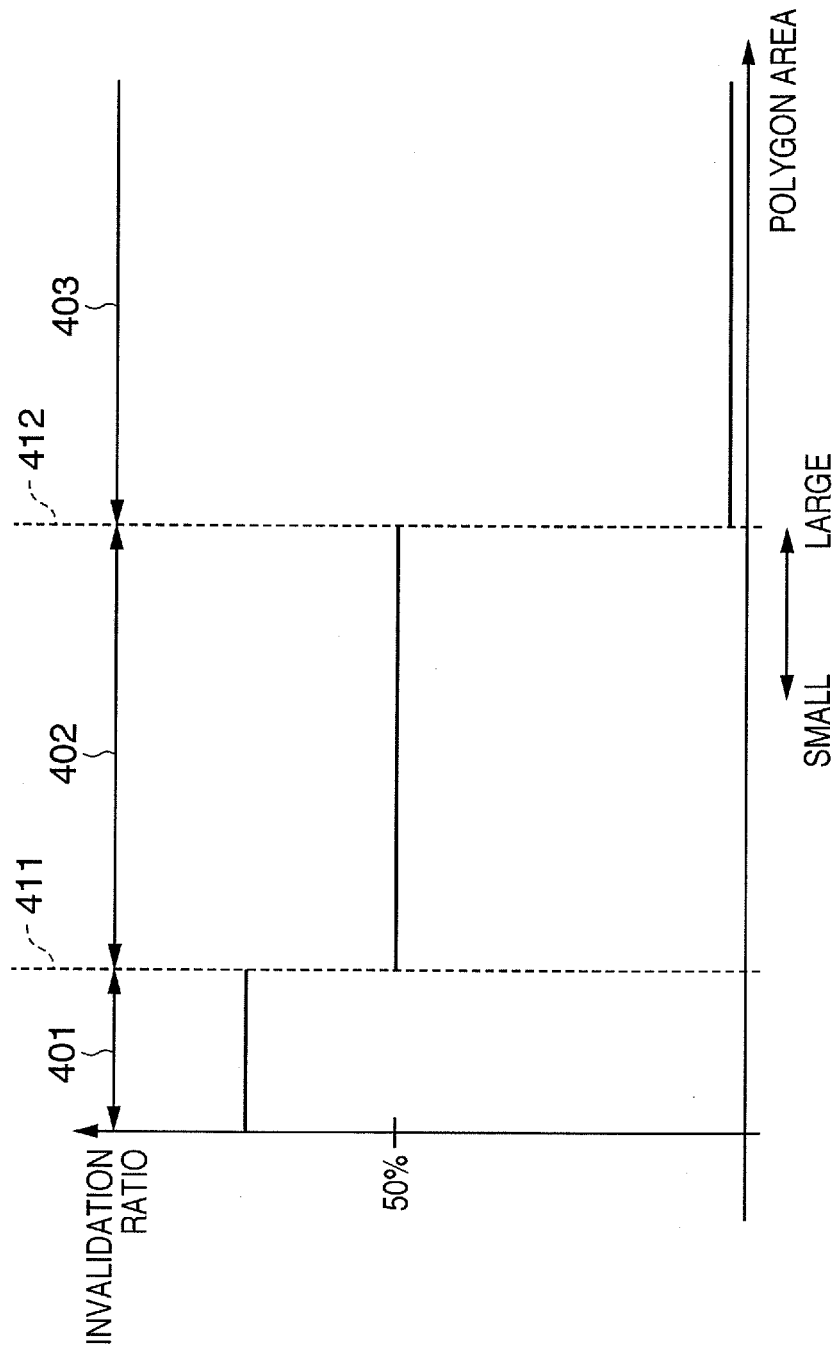
FIG. 5 is a graph of invalidation ratios set for the respective groups.

FIG. 5 is a graph of invalidation ratios set for the respective groups. Referring to FIG. 5, the abscissa represents the polygon area, and the ordinate represents the invalidation ratio.

In FIG. 5, an invalidation ratio (e.g., 70%) higher than 50% is given to the group (group 1) of polygons each having an area included in the section 401. An invalidation ratio of 50% is given to the group (group 2) of polygons each having an area included in the section 402. An invalidation ratio extremely close to 0% is given to the group (group 3) of polygons each having an area included in the section 403.

The invalidation ratio set for each group will be described. Assume that the polygon area at, e.g., the break 412 indicates the area of the hand virtual object. In this case, if a polygon larger than the area of the hand virtual object, i.e., a polygon having an area included in the section 403 is excluded from the collision determination target, the hand virtual object may pass through the polygon. Hence, an invalidation ratio extremely close to 0% is set for the section 403 (group 3) to make the collision determination target include almost all polygons each having an area included in the section 403.

A polygon having an area included in the section 402, i.e., a polygon forming a component such as a sensor component which is relatively small but indispensable in a work such as operation verification is much smaller than the area of the hand virtual object. Hence, an invalidation ratio of 50% is set for the section 402 (group 2) to exclude some of the polygons from the collision determination target while minimizing damage to the shapes of virtual objects including the polygons.

A polygon having an area included in the section 401, i.e., a polygon forming a very small component such as a screw is supposed to be able to maintain a sufficient collision determination accuracy regardless of damage to the shape. Hence, for the section 401 (group 1), the invalidation ratio is set to 50% or more, and for example, 75%. That is, polygons each having an area included in a section with a high invalidation ratio are rarely used for the collision determination process. Hence, the collision determination process can be done at a higher speed.

With the above-described process, an invalidation ratio can be set for each group. Hence, the ratio of polygons to be selected from all polygons in a group and which are used for the collision determination process can be determined on the basis of the invalidation ratio set for the group.

Figure 6:
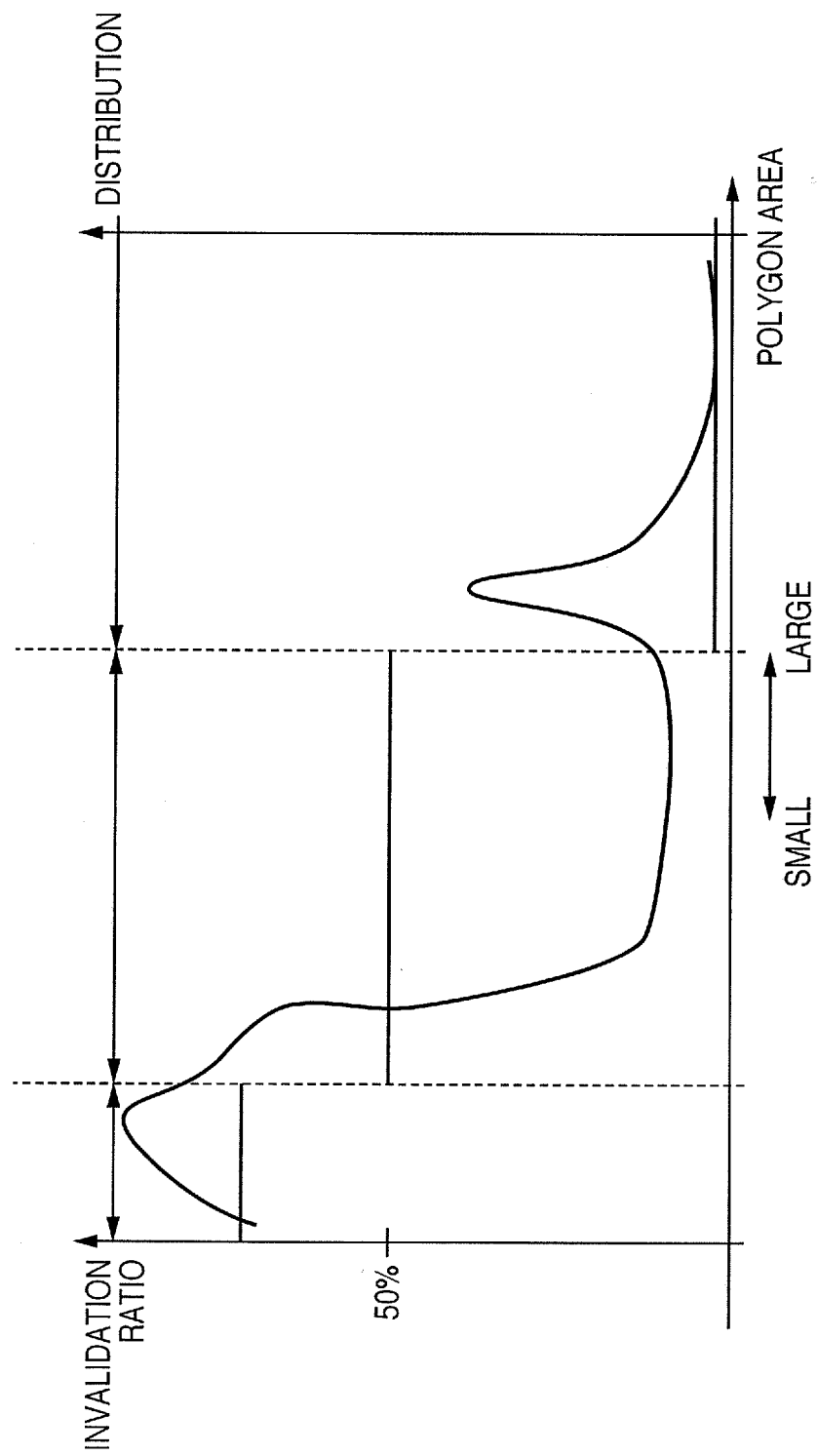
FIG. 6 is a graph obtained by superimposing the histogram in FIG. 4 on the graph in FIG. 5.

Various methods are available to classify polygons forming one virtual object into several groups in accordance with their areas and set an invalidation ratio for each of the groups. The present invention is not limited to a specific method. The invalidation ratio to be set for each group is not limited to a specific value, either. FIG. 6 is a graph obtained by superimposing the histogram in FIG. 4 on the graph in FIG. 5.

The polygon selection unit 125 selects, from the polygon sequence data, polygon data to be used for the collision determination process. More specifically, for the polygons each having an area included in group 1, the polygon selection unit 125 selects polygons to be used for the collision determination process on the basis of the invalidation ratio set for group 1. For the polygons each having an area included in group 2, the polygon selection unit 125 selects polygons to be used for the collision determination process on the basis of the invalidation ratio set for group 2. For the polygons each having an area included in group 3, the polygon selection unit 125 selects polygons to be used for the collision determination process on the basis of the invalidation ratio set for group 3.

A detailed example of the operation of the polygon selection unit 125 will be described. The polygon selection unit 125 refers to the area table and reads out all polygon indices associated with areas smaller than threshold value 1. Assume that the number of readout polygon indices is 10. The polygon selection unit 125 selects, from the 10 readout polygon indices, three polygon indices except polygon indices in number (=7) corresponding to the invalidation ratio (70%) set for group 1. The selection pattern is not particularly limited. The coordinate values of vertices included in the polygons with the selected polygon indices are described in the area 302. The polygon selection unit 125 acquires, from the area 302, the coordinate values of vertices included in the polygons with the selected polygon indices. The acquired coordinate values of the vertices are output to the collision determination unit 130 of the succeeding stage.

Next, the polygon selection unit 125 refers to the area table and reads out all polygon indices associated with areas from threshold value 1 (inclusive) to threshold value 2 (exclusive). Assume that the number of readout polygon indices is 20. The polygon selection unit 125 selects, from the 20 readout polygon indices, 10 polygon indices except polygon indices in number (−10) corresponding to the invalidation ratio (50%) set for group 2. The selection pattern is not particularly limited. The coordinate values of vertices included in the polygons with the selected polygon indices are described in the area 302. The polygon selection unit 125 acquires, from the area 302, the coordinate values of vertices included in the polygons with the selected polygon indices. The acquired coordinate values of the vertices are output to the collision determination unit 130 of the succeeding stage.

Finally, the polygon selection unit 125 refers to the area table and reads out all polygon indices associated with areas equal to or larger than threshold value 2. Assume that the number of readout polygon indices is 6. The polygon selection unit 125 selects, from the six readout polygon indices, six polygon indices except polygon indices in number (=0) corresponding to the invalidation ratio (0%) set for group 3. The selection pattern is not particularly limited. The coordinate values of vertices included in the polygons with the selected polygon indices are described in the area 302. The polygon selection unit 125 acquires, from the area 302, the coordinate values of vertices included in the polygons with the selected polygon indices. The acquired coordinate values of the vertices are output to the collision determination unit 130 of the succeeding stage.

It is possible by the above-described process to select polygons included in each group on the basis of the invalidation ratio set for the each group. The invalidation ratio reflects the relationship between a polygon included in each group and the area of the hand virtual object. Hence, when the collision determination process is executed by using the polygons selected on the basis of the invalidation ratio, the collision determination process can be speeded up by reducing the number of polygons used for the collision determination process while respecting the shapes of the whole virtual objects.

With the above-described process, the polygon determination unit 120 can select polygons to be used for the collision determination process from polygons forming one virtual object and output the coordinate values of the vertices of the selected polygons to the collision determination unit 130.

The collision determination unit 130 will be described next. The collision determination unit 130 receives, for each virtual object, the coordinate values of the vertices of polygons to be used for the collision determination process and determines the collision between the virtual objects by using the coordinate values. In this embodiment, the collision determination unit 130 determines the collision between the hand virtual object and the designed object virtual object. The collision determination result is output to the image processing unit 140.

The image processing unit 140 will be described next. As shown in FIG. 1, the image processing unit 140 includes an image generation unit 141 and a rendering unit 142. Upon receiving the polygon sequence data of each virtual object from the polygon sequence generation unit 112, the image generation unit 141 constructs the virtual objects by using the polygon sequence data. The technique of constructing a virtual object on the basis of polygon sequence data is known. Each constructed virtual object is laid out with a given position and orientation in virtual space. At this time, for a designed object virtual object which is determined by the collision determination unit 130 to collide against the hand virtual object, for example, the collision part may be displayed in a different manner, or the position and orientation may be changed by, e.g., moving the designed object virtual object in the moving direction of the hand virtual object.

The rendering unit 142 generates an image of the virtual space seen from a viewpoint with a given position and orientation. The technique of generating an image of virtual space seen from a viewpoint with a predetermined position and orientation is known.

The rendered image of the virtual space is output to a display device (not shown).

Figure 2:
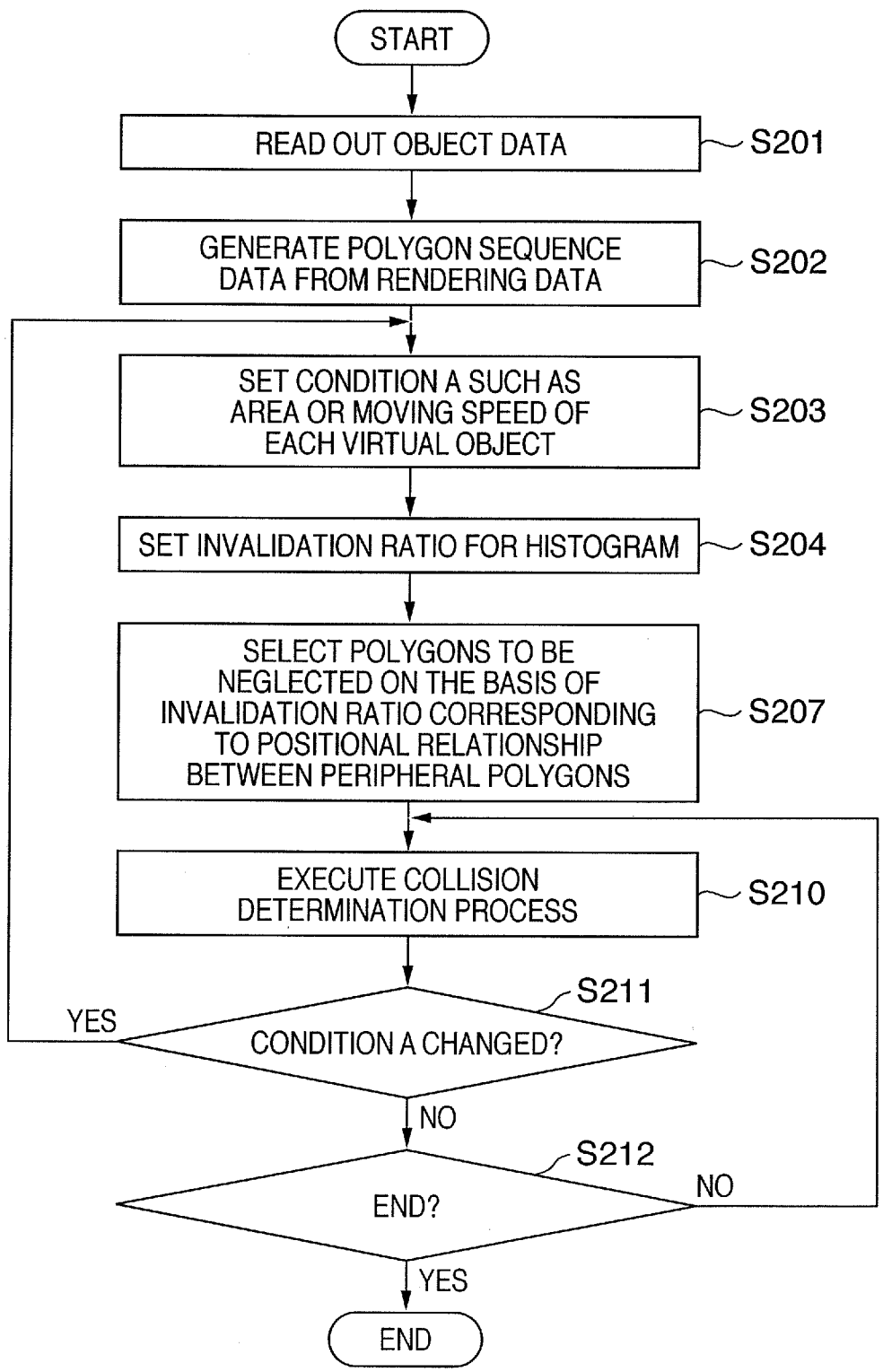
FIG. 2 is a flowchart of a collision determination process.

FIG. 2 is a flowchart of the above-described series of collision determination processes.

In step S201, the object data reading unit 111 reads out the rendering data of each virtual object from the memory (not shown). The object data reading unit 111 sequentially outputs the readout rendering data of each virtual object to the polygon sequence generation unit 112.

In step S202, the polygon sequence generation unit 112 sequentially converts each rendering data received from the object data reading unit 111 into polygon sequence data. The polygon sequence generation unit 112 outputs the polygon sequence data of each virtual object to the polygon determination unit 120 and image processing unit 140 of the succeeding stages.

In step S203, a condition A that an invalidation ratio to be used in a following process is determined on the basis of the polygon area is set. This setting may be done in advance. The condition A may be set for each virtual object.

In step S204, the histogram generation unit 123 calculates the area of each polygon registered in the polygon sequence data. The histogram generation unit 123 registers, in the area table, the area and the polygon index of the polygon whose area has been calculated in association with each other. The histogram generation unit 123 generates the histogram of the calculated polygon areas and outputs it to the screen of, e.g., a display device. When the user sets threshold values 1 and 2, groups 1 to 3 are automatically determined. The invalidation ratio function setting unit 121 sets an invalidation ratio for each of groups 1 to 3.

In step S207, the polygon selection unit 125 selects, from the polygon sequence data, polygon data to be used for the collision determination process. More specifically, for the polygons each having an area included in group 1, the polygon selection unit 125 selects polygons to be used for the collision determination process on the basis of the invalidation ratio set for group 1. For the polygons each having an area included in group 2, the polygon selection unit 125 selects polygons to be used for the collision determination process on the basis of the invalidation ratio set for group 2. For the polygons each having an area included in group 3, the polygon selection unit 125 selects polygons to be used for the collision determination process on the basis of the invalidation ratio set for group 3. For example, the polygon selection unit 125 selects a polygon, unselects (or selects) a polygon that is in contact with a side of the polygon, and unselects (or selects) a polygon that is in contact with a point of the polygon.

In step S210, the collision determination unit 130 receives, for each virtual object, the coordinate values of the vertices of the polygons to be used for the collision determination process and determines the collision between the virtual objects by using the received coordinate values. The collision determination result is output to the image processing unit 140.

If the condition A changes, the process returns to step S203. If the condition A does not change, the process advances to step S212. The process returns to step S210 via step S212 unless an instruction to finish the process is input, or a condition to finish the process is satisfied.

As described above, according to this embodiment, it is possible to execute a high-speed collision determination process by reducing the number of polygons, like the conventional polygon removal technique such as polygon reduction or detail level change.

The above-described embodiment is more useful than the prior art in the following points. In the prior art, the shapes of three-dimensional polygons themselves change so they do not match the three-dimensional polyhedron used in CG rendering. In this embodiment, however, only plane information is neglected in the collision determination process without losing vertex information in polygon sequence data. For this reason, the vertices are completely used in CG rendering so that the three-dimensional polygons can maintain the same shape as the three-dimensional polyhedron. It is not necessary for separately generating data for collision determination and data for CG rendering. Since data for CG rendering can directly be used for collision determination, the memory efficiency can improve.

When the maximum invalidation ratio is 50%, polygons are alternately removed in the area. As a result, even when the polygons are removed, line segment information in the three-dimensional polyhedron is held.

In the CG rendering process, if polygons are neglected in the same way, no normal rendering result can be obtained because of visual inconsistency caused by the problem of occlusion. In collision determination, however, no visualization is necessary. For this reason, if the collision target has a predetermined size or more, a sufficiently accurate collision result can be obtained even when small polygons in a very small component such as a screw are removed and neglected.

With the above-described effects, when an invalidation ratio is freely set in accordance with the shape of a three-dimensional object or the operation contents, the user can obtain real virtual experience meeting his/her desire while executing collision determination.

In this embodiment, the threshold values are preset. However, they may be edited as needed.

Second Embodiment

In this embodiment, the relative speed between a hand virtual object and each designed object virtual object is used as the condition A. The functional arrangement of an image processing apparatus according to this embodiment is the same as in FIG. 1.

In this embodiment, a histogram generation unit 123 calculates the relative speed between a moving hand virtual object and each designed object virtual object, and generates the histogram of relative speeds calculated for the respective designed object virtual objects. The histogram generation unit 123 outputs a thus generated histogram to the screen of, e.g., a display device. The user of the apparatus can grasp the relative speed between the moving hand virtual object and each designed object virtual object by observing the histogram. The user sets at least one threshold value for the relative speed. An invalidation ratio function setting unit 121 receives the setting input. The setting may be done not by user input but by the invalidation ratio function setting unit 121. In this embodiment, the user sets threshold values 1 and 2. However, the following description also applies to any case using threshold values set by the invalidation ratio function setting unit 121.

The invalidation ratio function setting unit 121 sets an invalidation ratio for each of a group (group 1) including designed object virtual objects whose relative speed to the hand virtual object is less than threshold value 1, a group (group 2) including designed object virtual objects whose relative speed to the hand virtual object ranges from threshold value 1 (inclusive) to threshold value 2 (exclusive), and a group (group 3) including designed object virtual objects whose relative speed to the hand virtual object is equal to or more than threshold value 2. In this embodiment, the invalidation ratio indicates the ratio of polygons of designed object virtual objects in a group, which are not used for collision determination. The invalidation ratio is set for each group.

Figure 7:
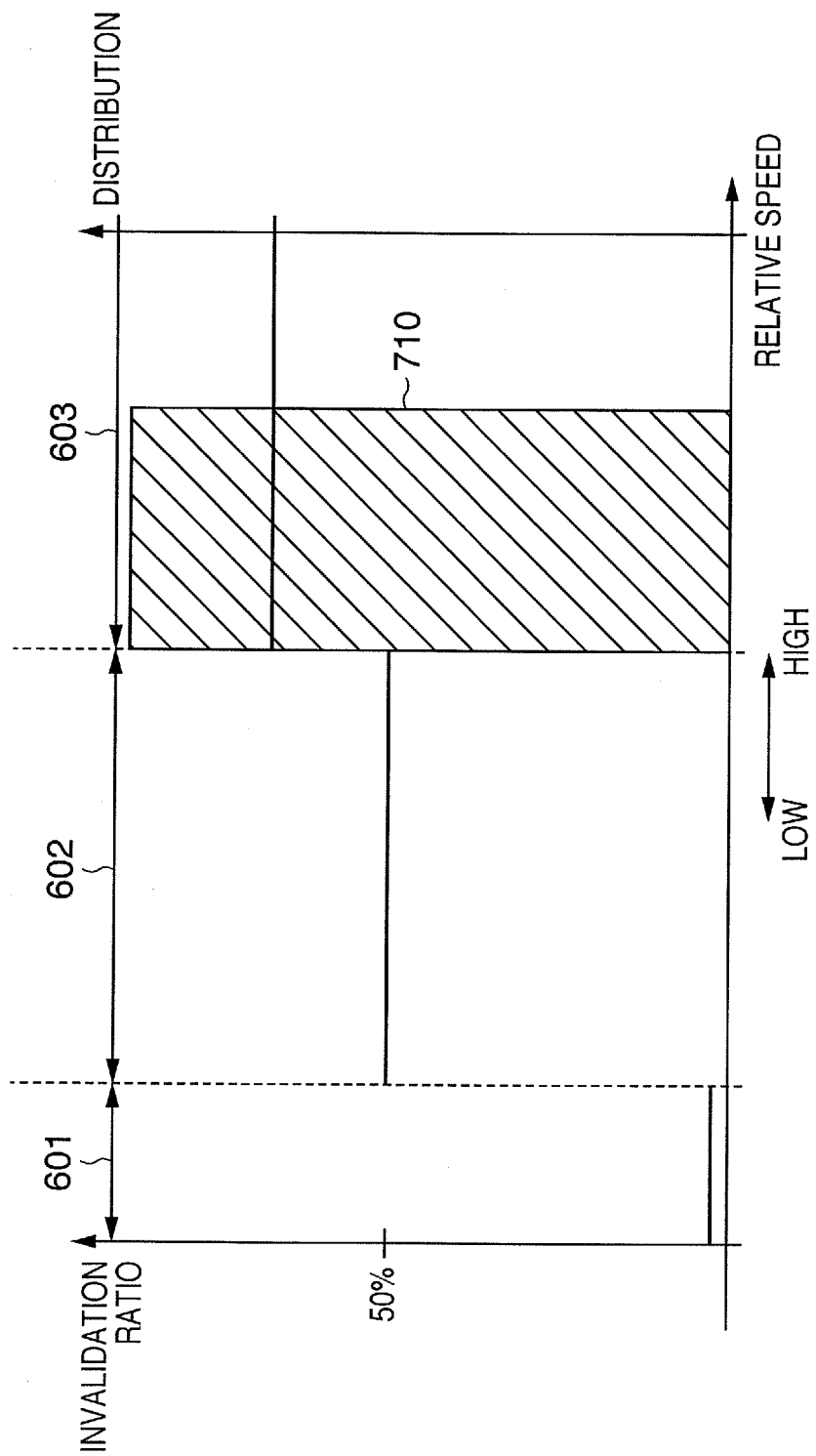
FIG. 7 is a graph obtained by superimposing the histogram of relative speeds between a hand virtual object and designed object virtual objects on the graph of invalidation ratios set for the respective groups.

FIG. 7 is a graph obtained by superimposing the histogram of the relative speeds between the hand virtual object and the designed object virtual objects on the graph of the invalidation ratios set for the respective groups. Referring to FIG. 7, the abscissa represents the relative speed between the hand virtual object and each designed object virtual object, and the ordinate represents the invalidation ratio and distribution.

In FIG. 7, the relative speed to the hand virtual object is less than threshold value 1 in a section 601. The relative speed to the hand virtual object ranges from threshold value 1 (inclusive) to threshold value 2 (exclusive) in a section 602. The relative speed to the hand virtual object is equal to or more than threshold value 2 in a section 603.

In FIG. 7, an invalidation ratio extremely close to 0% is given to designed object virtual objects included in the section 601. An invalidation ratio of 50% is given to designed object virtual objects included in the section 602. An invalidation ratio (e.g., 70%) higher than 50% is given to designed object virtual objects included in the section 603.

The invalidation ratio to be set for each group will be described. In a virtual operation verification test by moving an object quickly to a test area, no close examination is done. Instead, importance is placed on the operation followability (high-speed operability). If the hand virtual object moves at a high speed, a distribution 710 of relative speeds between the hand virtual object and the designed object virtual objects moves to the right in FIG. 7. In this case, a high invalidation ratio of more than 50% is set for the section 603, thereby speeding up the collision process between three-dimensional polyhedrons which are operating at a high speed.

Figure 8:
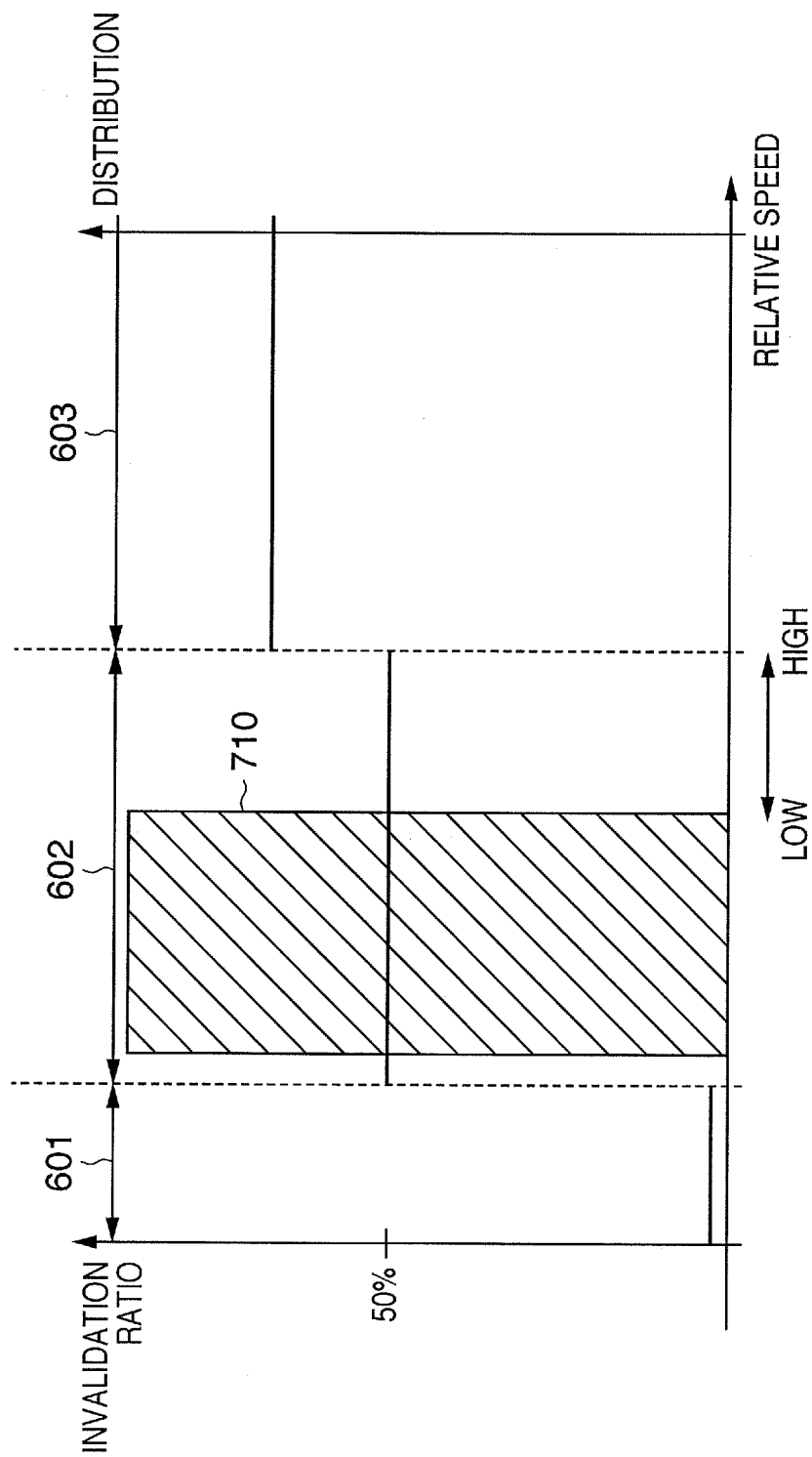
FIG. 8 is a graph showing a state wherein a distribution 710 in FIG. 7 moves to the left.

On the other hand, if close operation verification is being done near the area in a virtual operation verification test, the relative speed between the hand virtual object and each designed object virtual object decreases. When the hand virtual object is moving at a low speed, the distribution 710 of relative speeds between the hand virtual object and the designed object virtual objects moves to the left, as shown in FIG. 8. FIG. 8 is a graph showing a state wherein the distribution 710 in FIG. 7 moves to the left. In this case, an invalidation ratio of 50% is set for the section 602, thereby executing collision determination in details by using the data of ½ polygons without damaging the shapes of the virtual objects.

In the section 601, the relative speed further decreases, and closer operation verification is executed. In this case, an invalidation ratio extremely close to 0% is set for the section 601.

With this process, an invalidation ratio can be set for each designed object virtual object. The ratio of polygons to be used for collision determination to all polygons included in a designed object virtual object is determined on the basis of the invalidation ratio set for the designed object virtual object, as in the first embodiment.

The flowchart of the process according to this embodiment is fundamentally the same as in FIG. 2 except in the following points. In step S203, the condition A that an invalidation ratio to be used in a following process is determined on the basis of the relative speed to the hand virtual object is set.

In step S204, the histogram generation unit 123 calculates the relative speed between the hand virtual object and each designed object virtual object. The histogram generation unit 123 generates the histogram of the calculated relative speeds and outputs it to the screen of, e.g., a display device. When the user sets threshold values 1 and 2, groups 1 to 3 are automatically determined. The invalidation ratio function setting unit 121 sets an invalidation ratio for each of groups 1 to 3.

The first and second embodiments may be combined as needed. More specifically, to select a polygon to be used for the collision determination process of a designed object virtual object, the first embodiment is applied. To select a polygon to be used for the collision determination process of another designed object virtual object, the second embodiment is applied. In this case, since the criterion for selecting a collision determination target polygon can be changed in accordance with conditions, the method can easily be implemented in another existing collision determination operation apparatus.

Third Embodiment

In this embodiment, the number of polygons to be used to determine the collision between virtual objects in one frame is reduced. To do this, in this embodiment, polygons included in one virtual object are divided into m groups. Polygons included in one of the groups are used for collision determination in one frame. That is, in one frame, the collision determination process is executed by using polygons included in a group. In the next frame, the collision determination process is executed by using polygons included in another group.

One group includes polygons in such number that enables to end the collision determination process in one frame. The number changes depending on the processing speed of the apparatus for executing the collision determination process, as a matter of course. The image processing apparatus according to this embodiment has a functional arrangement without the invalidation ratio function setting unit 121 and histogram generation unit 123 in FIG. 1.

Figure 9:
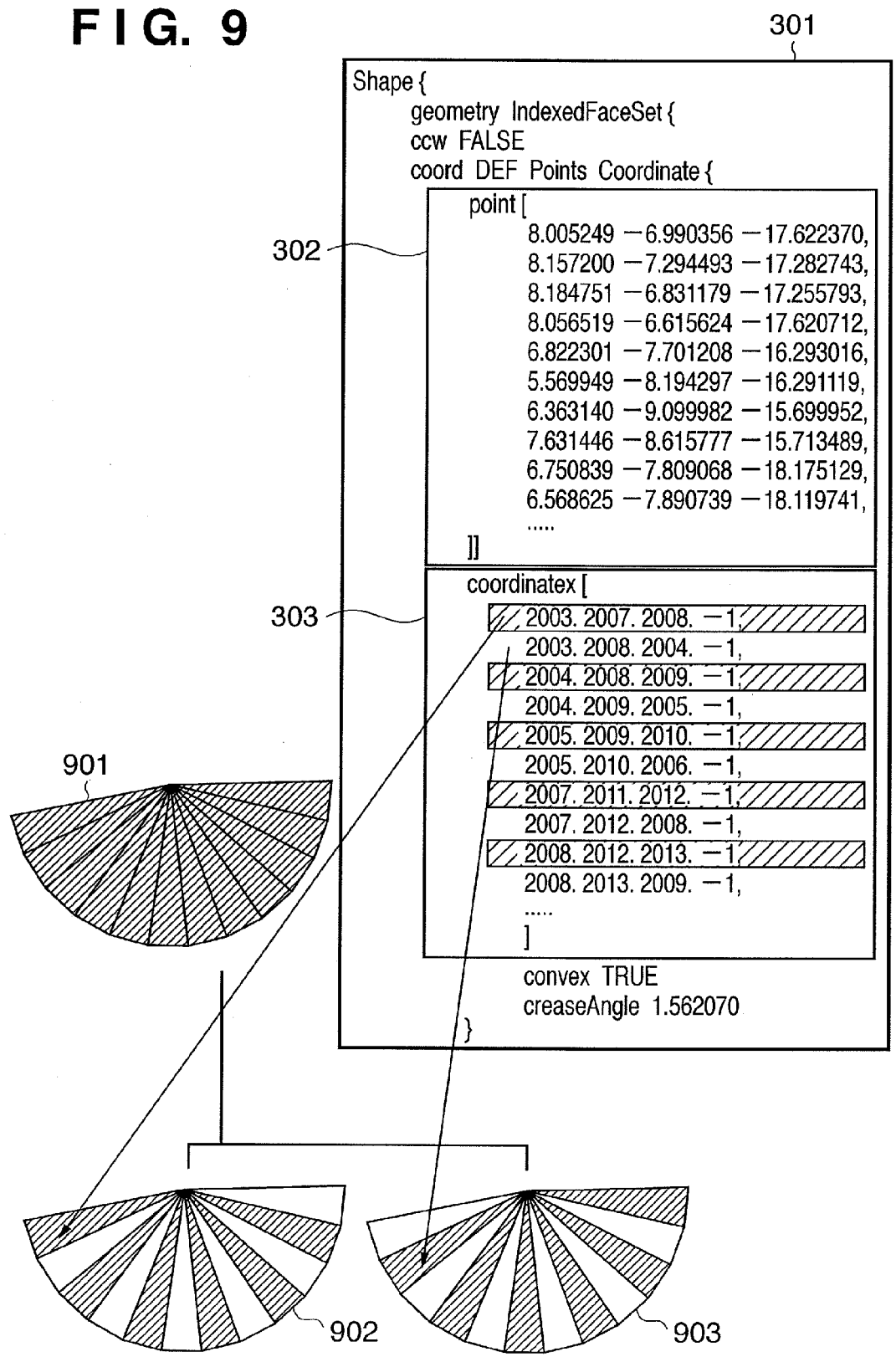
FIG. 9 is a view for explaining the third embodiment of the present invention when m=2.

FIG. 9 is a view for explaining this embodiment when m=2. The same reference numerals as in FIG. 3 denote the same parts in FIG. 9, and a description thereof will not be repeated.

The lines in an area 303 are divided into two (=m) groups, i.e., a group of lines with hatching and a group of line without hatching. Referring to FIG. 9, a virtual object 901 is formed by using polygons described in all lines in the area 303. A virtual object 902 is formed by using only polygons described in the lines with hatching in the area 303. A virtual object 903 is formed by using only polygons described in the lines without hatching in the area 303. Polygons are arranged in the hatched portions of the virtual objects 902 and 903. Blank portions without hatching have no polygons. That is, the polygons used in the virtual object 902 are not used in the virtual object 903, whereas the polygons used in the virtual object 903 are not used in the virtual object 902.

When the virtual object 901 is rendered in each frame, and the collision against the virtual object 901 is to be determined, the virtual objects 902 and 903 are alternately used for each frame. In this case, the collision determination process can be done in two frames by using all polygons included in the virtual object 901.

As described above, the number m of groups need not always be 2. More specifically, if the virtual space image rendering rate is, e.g., 30 Hz, the number m of groups is a result (integral value obtained by rounding up the fractional portion) obtained by dividing the total number of polygons included in a virtual object by the number of polygons which allows to complete collision determination in about 33 sec. In this case, the collision determination process using all polygons included in the virtual object 901 can be done in m frames. Note that the method of dividing the lines in the area 303 into m groups is not particularly limited, like the selection pattern.

To do the above-described process, the image processing apparatus according to this embodiment executes the following operation. A data reading unit 110 executes the same process as in the first embodiment. A polygon selection unit 125 refers to polygon sequence data and divides the lines in the area 303 into m groups. The division may be done in advance. The polygon selection unit 125 selects a group to be used in the current frame from the divide groups. The polygon selection unit 125 acquires, from an area 302, vertex coordinate values corresponding to the vertex indices of vertices registered in the lines included in the selected group and outputs the coordinate values to a collision determination unit 130.

Figure 10A:
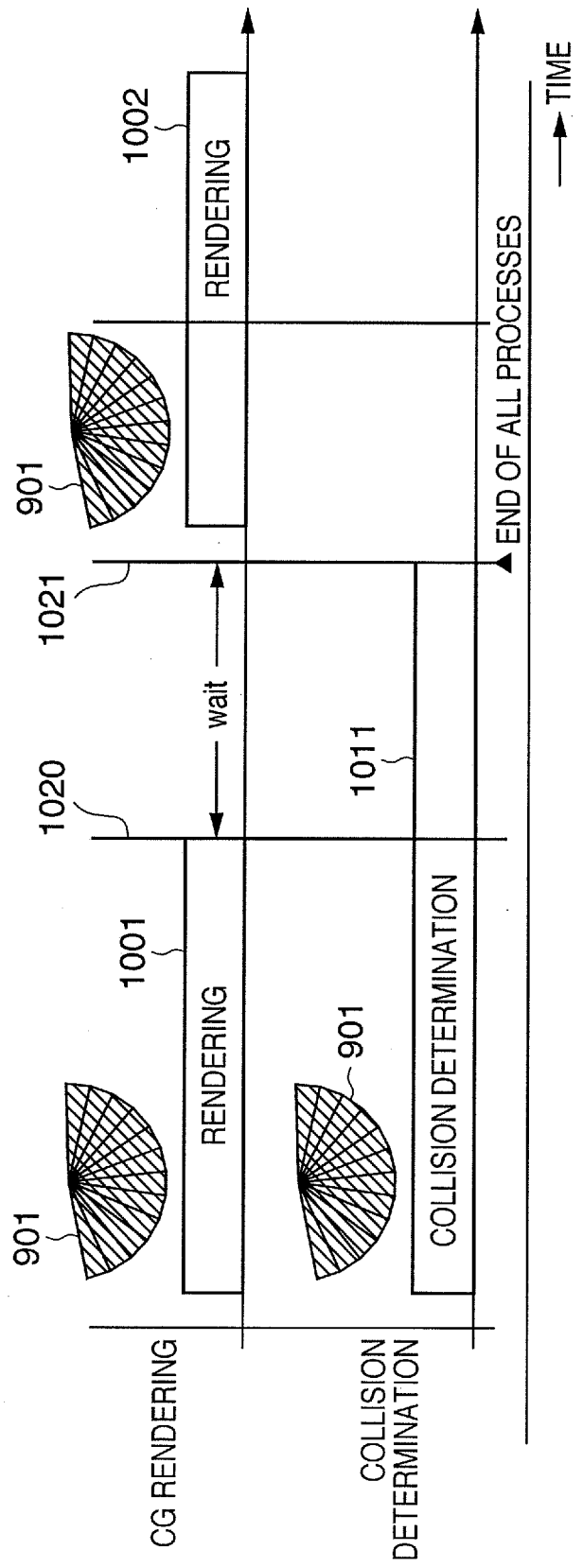
FIG. 10A is a timing chart of virtual space image rendering and a collision determination process executed in parallel.

FIGS. 10A and 10B are timing charts of virtual space image rendering and a collision determination process executed in parallel. Referring to FIGS. 10A and 10B, the abscissa represents the time.

In FIG. 10A, 1001 and 1002 indicate rendering periods of the virtual object 901, and 1011 indicates a period of collision determination of the virtual object 901. Conventionally, the period 1011 is generally longer than the periods 1001 and 1002, as shown in FIG. 10A. Hence, although rendering of the virtual object 901 finishes at a timing 1020, the collision determination process ends at a much later timing 1021, as shown in FIG. 10A. For this reason, rendering of the next frame (rendering in the period 1002) delays by a period indicated by "wait" (period between the end timing of the period 1001 and the end timing of the period 1011). This delay greatly impedes real-time experience.

In this embodiment, as shown in FIG. 10B, the collision determination process is executed by using the virtual object 902 including polygons in such number (½ of the original number of polygons in FIG. 10B) that finishes the collision determination process of the virtual object 901 at the timing 1020. In the next frame, the collision determination process is executed by using the virtual object 903 including polygons in such number (½ of the original number of polygons in FIG. 10B) that finishes the collision determination process of the virtual object 901 at the timing 1021. This allows to finish both the rendering process and the collision determination process in one frame (period from the timing 1020 to the timing 1021 in FIG. 10B). It is therefore possible to execute the collision determination process without decreasing the rendering rate.

As described above, since the collision determination process of all polygons included in one virtual object can be done in m frames, the collision determination result may be output every m frames.

In this embodiment, the process of constructing a virtual object by using selected polygons is the same as in the first embodiment.

Fourth Embodiment

In this embodiment, a case will be described in which an apparatus for rendering a virtual space image and an apparatus for executing a collision determination process described in the third embodiment are prepared separately and operated in parallel. When the number of groups is m, m apparatuses for executing the collision determination process are prepared. One apparatus takes charge of one group. An example when m=2 will be described below.

FIG. 11 is a timing chart of a process in each apparatus when m=2. The apparatus (CG rendering PC) for rendering a virtual space image renders a virtual space image in a period 1001. Two apparatuses for executing the collision determination process described in the third embodiment are prepared. One is collision determination PC 1, and the other is collision determination PC 2.

Collision determination PC 1 executes the collision determination process in a period 1101 by using a virtual object 902. Collision determination PC 2 executes the collision determination process in a period 1102 by using a virtual object 903. Both the periods 1101 and 1102 end before an end timing 1105 of the period 1001. Hence, the rendering process and the two collision determination processes can be completed in one frame.

A collision determination unit 130 refers to both the collision determination result from collision determination PC 1 and that from collision determination PC 2 and checks whether collision has occurred. It is possible to execute the collision determination process of all polygons included in a virtual object without decreasing the rendering rate.

The processes distributed to the apparatuses may be done in one apparatus in parallel.

Fifth Embodiment

All or some of the units shown in FIG. 1 may be implemented by software, and the remaining units may be implemented by hardware. In this case, for example, the hardware is implemented as a function expansion card that can be inserted into a personal computer. The function expansion card is inserted into a personal computer. The software is stored in the memory of the personal computer. According to this arrangement, the CPU of the personal computer executes the software and controls the operation of the function expansion card, thereby executing the same process as that described in the first embodiment (process corresponding to the flowchart in FIG. 2).

Figure 12:
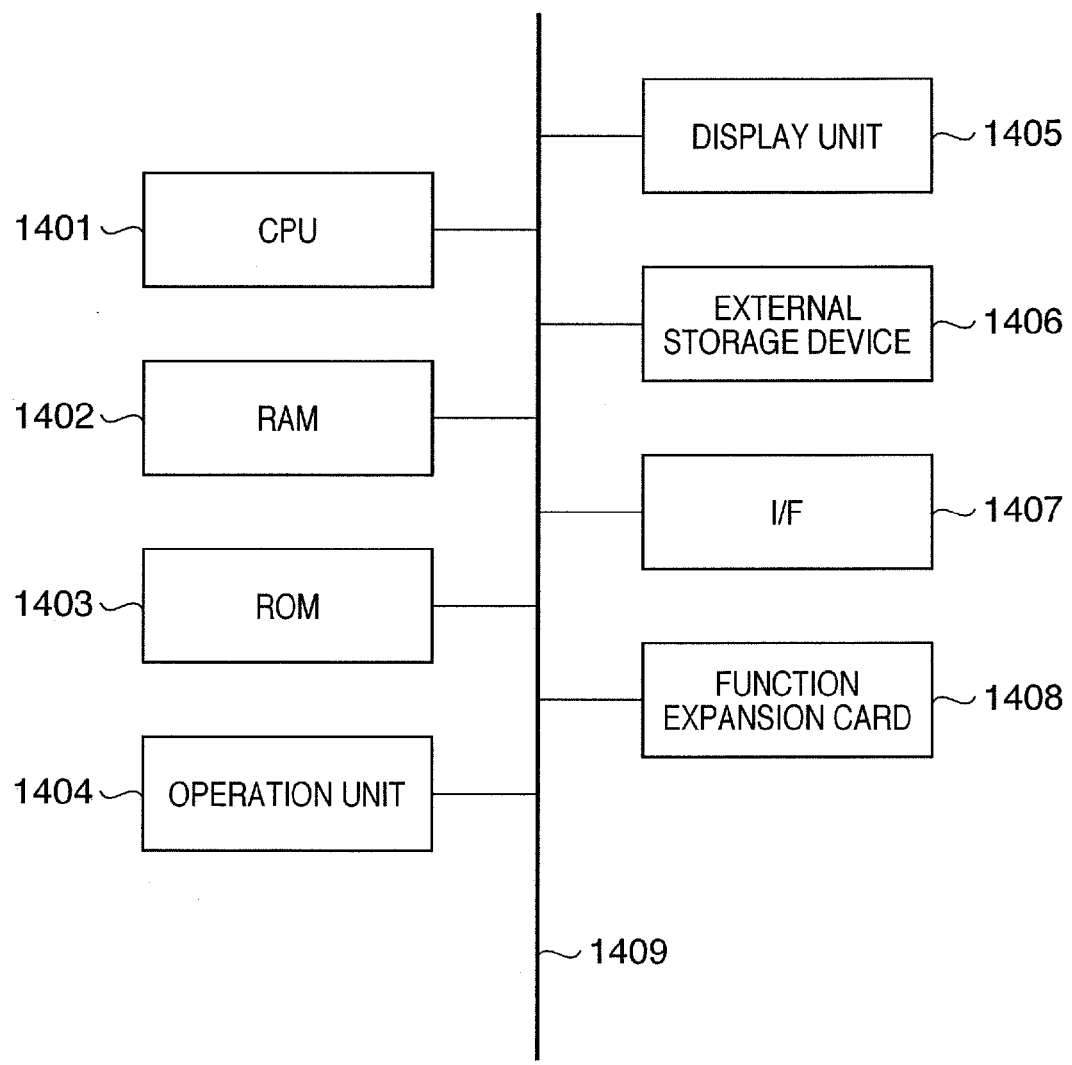
FIG. 12 is a block diagram showing the hardware configuration of a computer.

FIG. 12 is a block diagram showing the hardware configuration of the computer.

A CPU 1401 controls the overall computer by using programs and data stored in a RAM 1402 or ROM 1403.

The RAM 1402 has an area to temporarily store programs and data loaded from an external storage device 1406 or programs and data received from the outside via an I/F (interface) 1407. The RAM 1402 also has a work area to be used by the CPU 1401 to execute various kinds of processes. That is, the RAM 1402 can provide various kinds of areas as needed.

The ROM 1403 stores the setting data and boot program of the computer.

An operation unit 1404 includes a keyboard and a mouse. The operator of the computer can input various kinds of instructions to the CPU 1401 by operating the operation unit 1404.

A display unit 1405 including a CRT or liquid crystal screen can display a process result by the CPU 1401 as an image or text.

The external storage device 1406 is a mass storage device represented by a hard disk and saves an OS (Operating System) and programs and data to cause the CPU 1401 to execute various kinds of processes of the computer. The programs and data include the software and the operation control program of a function expansion card 1408. The external storage device 1406 also saves the polygon sequence data of each virtual object and programs and data received from the outside via the I/F 1407.

Various kinds of information saved in the external storage device 1406 are loaded to the RAM 1402 as needed under the control of the CPU 1401. When the CPU 1401 executes a process by using the loaded programs and data, the computer can execute the collision determination process described in the above embodiments.

The I/F 1407 connects the computer to a network such as a LAN or Internet.

The function expansion card 1408 is, e.g., a processing board to partially or wholly execute the virtual object rendering process or collision determination process.

A bus 1409 connects the above-described units.

Other Embodiments

The object of the present invention is also achieved by the following method. A recording medium (or storage medium) which records software program codes to implement the functions of the above-described embodiments is supplied to a system or apparatus. The computer (or CPU or MPU) of the system or apparatus reads out and executes the program codes stored in the recording medium. In this case, the program codes read out from the recording medium themselves implement the functions of the above-described embodiments. The recording medium that records the program codes constitutes the present invention.

When the computer executes the readout program codes, the operating system (OS) running on the computer partially or wholly executes actual processing on the basis of the instructions of the program codes, thereby implementing the functions of the above-described embodiments.

The program codes read out from the recording medium are written in the memory of a function expansion card inserted into the computer or a function expansion unit connected to the computer. The CPU of the function expansion card or function expansion unit partially or wholly executes actual processing on the basis of the instructions of the program codes, thereby implementing the functions of the above-described embodiments.

The recording medium to which the present invention is applied stores program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-269017 filed Sep. 29, 2006, which is hereby incorporated by reference herein in its entirety.

What is claimed is:

1. An image processing method of executing a collision determination process between three-dimensional virtual objects, comprising:

a division step of dividing, for each of the three-dimensional virtual objects, elements which represent polygon surfaces which constitute the three-dimensional virtual object into a plurality of groups;

a setting step of setting, for each of the plurality of groups, an invalidation ratio which indicates a ratio of elements being not used for the collision determination process in the group;

a selection step of selecting, on the basis of the invalidation ratio set for each of the plurality of groups, elements to be used for the collision determination process from each of the plurality of groups; and collision determination step of executing, by a collision determination unit, the collision determination process between the three-dimensional virtual objects using the elements selected for each of the three-dimensional virtual objects.

2. The method according to claim 1, wherein the division step comprises steps of:

calculating areas of the elements of which the three-dimensional virtual object consists; and dividing the elements which represent polygon surfaces which constitute the three-dimensional virtual object into the plurality of groups according to the calculated areas.

3. The method according to claim 1, wherein the division step comprises steps of:

calculating a relative speed between the three-dimensional virtual objects; and dividing the elements which represent polygon surfaces which constitute the three-dimensional virtual object into the plurality of groups according to the calculated relative speed.

4. The method according to claim 1, wherein in the selection step selects a number of elements that allows the collision determination process to finish in one frame.

5. A non-transitory computer-readable storage medium storing a program which causes a computer to execute an image processing method of claim 1.

6. An image processing apparatus, including a memory, for executing a collision determination process between three-dimensional virtual objects, comprising:

a division unit adapted to divide, for each of the three-dimensional virtual objects, elements which represent polygon surfaces which constitute the three-dimensional virtual object into a plurality of groups;

a setting unit adapted to set, for each of the plurality of groups, an invalidation ratio which indicates a ratio of elements being not used for the collision determination process in the group;

a selection unit adapted to select, on the basis of the invalidation ratio set for each of the plurality of groups, elements to be used for the collision determination process from each of the plurality of groups; and a collision determination unit adapted to execute the collision determination process between objects using the elements selected for each of the three-dimensional virtual objects.

* * * * *